(12) United States Patent
Nehlen, III

(10) Patent No.: US 12,528,034 B2
(45) Date of Patent: Jan. 20, 2026

(54) REGENERATIVE MEDIA FILTER

(71) Applicant: Paul F. Nehlen, III, Delavan, WI (US)

(72) Inventor: Paul F. Nehlen, III, Delavan, WI (US)

(73) Assignee: Blue Skies Global LLC, Williams Bay, WI (US)

( * ) Notice: Subject to any disclaimer, the term of this patent is extended or adjusted under 35 U.S.C. 154(b) by 91 days.

(21) Appl. No.: 18/381,808

(22) Filed: Oct. 19, 2023

(65) Prior Publication Data

US 2024/0131456 A1 Apr. 25, 2024
US 2024/0226782 A9 Jul. 11, 2024

Related U.S. Application Data

(60) Provisional application No. 63/418,384, filed on Oct. 21, 2022.

(51) Int. Cl.
| | |
|---|---|
| *B01D 29/64* | (2006.01) |
| *B01D 29/15* | (2006.01) |
| *B01D 29/52* | (2006.01) |
| *B01D 29/60* | (2006.01) |

(Continued)

(52) U.S. Cl.
CPC ......... *B01D 29/6438* (2013.01); *B01D 29/15* (2013.01); *B01D 29/52* (2013.01); *B01D 29/60* (2013.01); *B01D 29/66* (2013.01); *B01D 35/30* (2013.01); *B01D 2201/043* (2013.01); *B01D 2201/081* (2013.01); *B01D 2201/16* (2013.01);

(Continued)

(58) Field of Classification Search
None
See application file for complete search history.

(56) References Cited

U.S. PATENT DOCUMENTS

| | | | | |
|---|---|---|---|---|
| 429,688 A | * | 6/1890 | Hyatt | B01J 47/022 |
| | | | | 210/291 |
| 471,811 A | * | 3/1892 | Deutsch | B01D 24/14 |
| | | | | 210/150 |

(Continued)

FOREIGN PATENT DOCUMENTS

| | | |
|---|---|---|
| CA | 1 197 473 | 12/1985 |
| GB | 778524 | 7/1957 |

(Continued)

*Primary Examiner* — Robert J Popovics
(74) *Attorney, Agent, or Firm* — Salter & Michaelson

(57) ABSTRACT

A regenerative filter that includes a filter housing having inlet and outlet zones; a fluid path provided between the inlet and outlet zones; a plurality of filter elements each having an outer surface filter media applied thereto and functioning to filter particulate or contaminants from the fluid path. The filter elements are disposed in an monolithic array. An inlet port arrangement is disposed at the filter housing leading to the inlet zone and is constructed and arranged to direct the fluid path into the filter housing in a manner so as to maintain a controlled turbulence at the inlet zone. The inlet port arrangement comprises a pair of inlet ports that are arranged in juxtaposition at the inlet zone and each having one end where the fluid flow enters. Embodiments that are considered as falling under the scope of the present invention include 1. Single inlet/two or more outlets; 2. Two or more inlets/single outlet, or 3. Two or more inlets and two or more outlets.

19 Claims, 14 Drawing Sheets

(51) Int. Cl.
  *B01D 29/66* (2006.01)
  *B01D 35/30* (2006.01)
(52) U.S. Cl.
  CPC .. *B01D 2201/287* (2013.01); *B01D 2201/303* (2013.01)

(56) References Cited

U.S. PATENT DOCUMENTS

| | | | | |
|---|---|---|---|---|
| 476,737 A * | 6/1892 | Deutsch | C02F 1/42 | 210/291 |
| 484,781 A * | 10/1892 | Deutsch | B01D 24/266 | 210/279 |
| 512,298 A * | 1/1894 | Hyatt | B01D 24/14 | 210/118 |
| 607,155 A * | 7/1898 | Bleakly et al. | B01D 24/005 | 210/279 |
| 633,066 A * | 9/1899 | Brewer | B01F 23/231265 | 126/379.1 |
| 653,160 A * | 7/1900 | Williamson | B01D 24/24 | 210/279 |
| 1,196,058 A * | 8/1916 | Widner | B01J 49/75 | 210/279 |
| 1,405,406 A * | 2/1922 | Genter | B01D 24/4673 | 210/436 |
| 1,784,893 A * | 12/1930 | Duden | C02F 1/42 | 210/269 |
| 1,794,841 A * | 3/1931 | Elfreth | B01D 24/4684 | 210/275 |
| 1,873,594 A * | 8/1932 | Johnson | C02F 1/42 | 210/436 |
| 1,997,114 A * | 4/1935 | Martin | B01D 37/03 | 210/275 |
| 2,064,510 A | 12/1936 | Wells | | |
| 2,098,903 A * | 11/1937 | Slidell | C02F 1/42 | 210/291 |
| 2,101,961 A * | 12/1937 | Slidell | C02F 1/42 | 210/275 |
| 2,327,648 A | 8/1943 | Kasten | | |
| 2,360,958 A * | 10/1944 | Massorley | B01D 24/14 | 210/292 |
| 2,374,976 A | 5/1945 | Briggs et al. | | |
| 2,547,277 A | 4/1951 | Marsh et al. | | |
| 2,562,328 A * | 7/1951 | Null | B05B 15/40 | 210/489 |
| 2,562,699 A | 7/1951 | Cooperson et al. | | |
| 2,620,892 A * | 12/1952 | Stover | B01D 53/26 | 210/DIG. 6 |
| 2,657,121 A * | 10/1953 | Rollins | B01J 8/0278 | 422/220 |
| 2,674,376 A * | 4/1954 | Swan | B01D 29/114 | 210/435 |
| 2,743,230 A * | 4/1956 | Meyer | C02F 1/42 | 210/281 |
| 2,768,750 A * | 10/1956 | Kryzer | C02F 1/42 | 210/291 |
| 2,772,780 A * | 12/1956 | Penick | B01J 8/20 | 422/220 |
| 2,773,829 A * | 12/1956 | Hunting | B01J 49/60 | 210/678 |
| 3,011,643 A * | 12/1961 | Mccoy | B01D 24/004 | 210/167.13 |
| 3,048,275 A | 8/1962 | Headrick | | |
| 3,100,190 A | 8/1963 | Hobson, Jr. | | |
| 3,149,072 A | 9/1964 | Silverman | | |
| 3,170,873 A * | 2/1965 | May | B01D 17/045 | 210/323.2 |
| 3,240,699 A * | 3/1966 | Duff | B01J 49/90 | 210/275 |
| 3,276,590 A * | 10/1966 | Schmid | B01D 24/4631 | 210/279 |
| 3,289,847 A | 12/1966 | Rothemund | | |
| 3,291,311 A * | 12/1966 | Pratt | B01D 24/14 | 210/497.1 |
| 3,402,126 A * | 9/1968 | Cioffi | B01J 47/04 | 210/686 |
| 3,451,554 A * | 6/1969 | Wade | B01D 24/4642 | 210/279 |
| 3,491,882 A * | 1/1970 | Elam | C10G 33/06 | 210/791 |
| 3,547,270 A * | 12/1970 | Kass | B01D 24/4636 | 210/279 |
| 3,618,774 A * | 11/1971 | Delphia | B01D 24/4876 | 210/167.13 |
| 3,625,365 A * | 12/1971 | Armstrong | B01D 24/14 | 210/279 |
| 3,633,753 A | 1/1972 | Petitjean | | |
| 3,685,657 A * | 8/1972 | Hunter | B01D 24/14 | 210/289 |
| 3,715,033 A | 2/1973 | Soriente | | |
| 3,717,254 A * | 2/1973 | Benecke | B01J 49/09 | 210/279 |
| 3,747,768 A * | 7/1973 | Barrera | B01D 24/4876 | 210/288 |
| 3,757,954 A * | 9/1973 | Toth | B01D 24/4621 | 210/284 |
| 3,785,779 A * | 1/1974 | Li | B01J 4/001 | 422/231 |
| 3,826,375 A * | 7/1974 | Fournier | B01J 47/022 | 210/291 |
| 3,847,805 A * | 11/1974 | Voedisch | B01J 8/025 | 210/189 |
| 3,984,327 A * | 10/1976 | May | B01D 24/14 | 210/345 |
| 4,013,556 A * | 3/1977 | Evans | B01J 47/022 | 210/291 |
| 4,033,875 A | 7/1977 | Besik | | |
| 4,075,102 A * | 2/1978 | Ferrin | B01D 24/42 | 210/291 |
| 4,094,790 A * | 6/1978 | Schmidt, Jr. | B01D 29/52 | 210/291 |
| 4,098,695 A * | 7/1978 | Novotny | B01D 24/14 | 210/279 |
| 4,107,044 A * | 8/1978 | Levendusky | G21F 9/12 | 976/DIG. 383 |
| 4,134,836 A | 1/1979 | Rowley et al. | | |
| 4,161,963 A * | 7/1979 | Stevens | B01D 24/14 | 422/279 |
| 4,169,793 A * | 10/1979 | Lockshaw | B01D 24/14 | 210/167.13 |
| 4,200,536 A * | 4/1980 | Kaufman | B01D 24/4631 | 210/291 |
| 4,353,722 A | 10/1982 | Berz | | |
| 4,364,830 A * | 12/1982 | Roberts | B01D 24/42 | 210/268 |
| 4,414,109 A * | 11/1983 | Aurthur | B01D 24/14 | 210/278 |
| 4,473,472 A | 9/1984 | Muller | | |
| 4,517,086 A | 5/1985 | Romey et al. | | |
| 4,568,463 A | 2/1986 | Klein | | |
| 4,580,597 A * | 4/1986 | Cordingley | F24H 9/133 | 137/561 A |
| 4,604,201 A | 8/1986 | Muller | | |
| 4,609,462 A | 9/1986 | Flynn | | |
| 4,655,242 A * | 4/1987 | Hamazaki | F16K 13/10 | 137/247.35 |
| 4,657,673 A | 4/1987 | Kessler | | |
| 4,753,726 A * | 6/1988 | Suchanek | B01D 24/4876 | 210/279 |
| 4,773,998 A * | 9/1988 | Heinrich | B01D 24/4631 | 210/279 |
| 4,816,155 A * | 3/1989 | Linderman | B01D 29/33 | 137/561 A |
| 4,872,981 A | 10/1989 | Hobson, Jr. | | |
| 4,931,175 A | 6/1990 | Krofta | | |
| 5,066,393 A * | 11/1991 | Padera | C02F 1/42 | 210/291 |

(56) References Cited

U.S. PATENT DOCUMENTS

| | | | | |
|---|---|---|---|---|
| 5,068,033 A * | 11/1991 | Tobias | ............... | B01D 24/14 |
| | | | | 210/345 |
| 5,087,272 A | 2/1992 | Nixdorf | | |
| 5,128,038 A | 7/1992 | Slavitschek et al. | | |
| 5,230,131 A * | 7/1993 | Hobson, Jr. | ............ | B01D 29/96 |
| | | | | 29/402.06 |
| 5,277,829 A | 1/1994 | Ward | | |
| 5,397,465 A | 3/1995 | Stewart | | |
| 5,407,570 A * | 4/1995 | Hobson, Jr. | ............ | B01D 29/15 |
| | | | | 210/232 |
| 5,435,911 A | 7/1995 | Hohle | | |
| 5,441,633 A * | 8/1995 | Schewitz | ............ | B01D 29/908 |
| | | | | 210/323.2 |
| 5,500,134 A | 3/1996 | Chahine | | |
| 5,518,609 A * | 5/1996 | Karlsson | ............ | B01D 29/605 |
| | | | | 210/97 |
| 5,575,832 A | 11/1996 | Boyd | | |
| 5,628,916 A * | 5/1997 | Stevens | ............... | B01D 29/52 |
| | | | | 210/799 |
| 5,637,278 A * | 6/1997 | Smith | ............... | B01D 24/167 |
| | | | | 210/275 |
| 5,667,679 A | 9/1997 | Bozenmayer et al. | | |
| 5,693,362 A * | 12/1997 | Boos | ............ | B01J 8/006 |
| | | | | 118/712 |
| 5,714,062 A * | 2/1998 | Winkler | ............ | C02F 3/20 |
| | | | | 210/220 |
| 5,723,043 A * | 3/1998 | Hawk | ............ | C02F 3/06 |
| | | | | 210/275 |
| 5,762,785 A * | 6/1998 | Garrigos Ruiz | ....... | B01D 24/14 |
| | | | | 210/287 |
| 5,766,458 A | 6/1998 | Sekhar et al. | | |
| 5,855,799 A | 1/1999 | Hermann | | |
| 5,932,092 A * | 8/1999 | Hawk | ............ | C02F 3/06 |
| | | | | 210/287 |
| 5,963,709 A | 10/1999 | Staples et al. | | |
| 6,007,718 A | 12/1999 | Booth | | |
| 6,059,967 A * | 5/2000 | Field | ............... | B01D 24/4631 |
| | | | | 210/275 |
| 6,100,081 A * | 8/2000 | Buelna | ............ | B01D 53/85 |
| | | | | 210/150 |
| 6,309,552 B1 | 10/2001 | Hobson, Jr. | | |
| 6,342,158 B1 | 1/2002 | Wills | | |
| 6,365,044 B1 * | 4/2002 | Crane | ............... | B01D 24/40 |
| | | | | 210/167.01 |
| 6,365,054 B1 * | 4/2002 | Kruger | ............... | B01D 29/52 |
| | | | | 210/411 |
| 6,419,842 B1 * | 7/2002 | Kupka | ............ | F26B 7/00 |
| | | | | 210/330 |
| 6,428,690 B1 * | 8/2002 | Tse | ............... | B01D 24/4631 |
| | | | | 210/275 |
| 6,439,273 B1 * | 8/2002 | Kruger | ............ | B01D 29/114 |
| | | | | 141/69 |
| 6,537,449 B2 | 3/2003 | Schewitz | | |
| 6,605,211 B1 * | 8/2003 | Slopack | ............ | B01D 24/4631 |
| | | | | 210/275 |
| 6,616,842 B1 | 9/2003 | Soria et al. | | |
| 6,685,826 B1 * | 2/2004 | James | ............ | B01J 19/30 |
| | | | | 210/150 |
| 6,709,574 B2 * | 3/2004 | James | ............ | C02F 3/10 |
| | | | | 210/150 |
| 6,860,394 B1 | 3/2005 | Mueller et al. | | |
| 6,872,310 B2 * | 3/2005 | Trotzki | ............... | B01D 29/52 |
| | | | | 210/345 |
| 7,022,230 B2 * | 4/2006 | Imai | ............... | B01D 24/14 |
| | | | | 210/291 |
| 7,097,766 B2 * | 8/2006 | Moya | ............ | B01D 24/14 |
| | | | | 210/280 |
| 7,163,626 B1 * | 1/2007 | Cuypers | ............... | B04C 3/00 |
| | | | | 210/512.1 |
| 7,217,363 B2 * | 5/2007 | Mulvey | ............ | B01D 24/14 |
| | | | | 210/279 |
| 7,341,662 B2 * | 3/2008 | Tolley | ............... | B01D 24/407 |
| | | | | 210/275 |
| 7,381,336 B2 | 6/2008 | Stedman | | |
| 7,513,993 B2 * | 4/2009 | Goodwin | ............ | B01D 24/105 |
| | | | | 210/167.13 |
| 7,651,619 B2 * | 1/2010 | Hansen | ............... | B01D 33/466 |
| | | | | 210/384 |
| 7,666,318 B1 | 2/2010 | Lehtinen et al. | | |
| 7,882,960 B2 * | 2/2011 | Hansen | ............... | B01D 35/12 |
| | | | | 210/396 |
| 7,901,585 B1 | 3/2011 | Lehtinen et al. | | |
| 7,914,678 B2 * | 3/2011 | Beggs | ............... | C02F 3/04 |
| | | | | 210/150 |
| 8,252,172 B2 | 8/2012 | Hall | | |
| 8,303,688 B2 | 11/2012 | Sharma | | |
| 8,309,711 B2 * | 11/2012 | Wiley | ............... | B01D 29/94 |
| | | | | 210/411 |
| D673,647 S * | 1/2013 | Tandon | ............... | D23/209 |
| 8,465,571 B2 | 6/2013 | Billiet | | |
| 8,795,521 B1 * | 8/2014 | McBride | ............ | B01D 24/4631 |
| | | | | 210/189 |
| 9,127,896 B1 | 9/2015 | Nehlen, III | | |
| 9,149,742 B1 | 10/2015 | Nehlen, III | | |
| 9,174,149 B2 * | 11/2015 | Lee | ............... | B01D 24/4631 |
| 9,302,205 B1 | 4/2016 | Nehlen, III | | |
| 9,303,924 B1 | 4/2016 | Nehlen, III | | |
| 9,387,421 B1 | 7/2016 | Nehlen, III | | |
| 9,494,372 B2 | 11/2016 | Nehlen, III | | |
| 9,505,990 B2 * | 11/2016 | Sams | ............... | B01F 25/31331 |
| 9,581,395 B2 | 2/2017 | Nehlen, III | | |
| 9,630,130 B2 | 4/2017 | Nehlen, III | | |
| 9,827,512 B2 * | 11/2017 | Malone | ............... | B01D 24/40 |
| 9,943,784 B2 * | 4/2018 | Kirk | ............... | B05B 1/3405 |
| 10,406,458 B1 | 9/2019 | Nehlen, III | | |
| 10,596,497 B2 * | 3/2020 | Backman | ............... | B01D 33/466 |
| 10,814,255 B1 | 10/2020 | Nehlen, III | | |
| 10,814,256 B1 * | 10/2020 | Nehlen, III | ............ | B01D 29/52 |
| 10,850,216 B1 | 12/2020 | Nehlen, III | | |
| 10,933,353 B2 * | 3/2021 | Saul | ............... | B01D 24/12 |
| 10,981,091 B1 | 4/2021 | Nehlen, III | | |
| 11,065,566 B2 | 7/2021 | Nehlen, III | | |
| 11,167,226 B2 | 11/2021 | Nehlen, III | | |
| 11,471,798 B2 * | 10/2022 | Vallejo | ............... | C02F 1/006 |
| 11,559,757 B2 * | 1/2023 | Ruzicka | ............... | B01D 35/30 |
| 11,673,079 B2 | 6/2023 | Nehlen, III | | |
| 11,717,775 B2 * | 8/2023 | Maiworm | ............... | A23D 9/04 |
| | | | | 210/323.1 |
| 11,826,678 B2 * | 11/2023 | Saul | ............... | B01D 24/24 |
| 11,827,530 B2 * | 11/2023 | Itai | ............... | B01D 24/105 |
| 11,951,424 B2 * | 4/2024 | Shuster | ............... | B01D 29/56 |
| 11,958,002 B2 * | 4/2024 | Kim | ............... | B01D 29/15 |
| 12,139,420 B2 * | 11/2024 | Phillips | ............... | B03D 1/1462 |
| 12,215,555 B2 * | 2/2025 | John | ............... | B01D 37/046 |
| 12,312,251 B2 * | 5/2025 | Gozashti | ............... | C02F 9/20 |
| 12,330,093 B2 * | 6/2025 | Nehlen, III | ............ | B01D 29/90 |
| 12,330,094 B2 * | 6/2025 | Nehlen, III | ............ | B01D 29/17 |
| 12,397,247 B2 * | 8/2025 | Armstrong | ............ | B01D 61/10 |
| 2002/0038783 A1 * | 4/2002 | Trotzki | ............... | B01D 29/114 |
| | | | | 210/407 |
| 2002/0158002 A1 * | 10/2002 | Trotzki | ............... | B01D 29/114 |
| | | | | 210/384 |
| 2003/0024885 A1 * | 2/2003 | Ekholm | ............... | B01D 3/008 |
| | | | | 210/418 |
| 2003/0146174 A1 * | 8/2003 | Hansen | ............... | B01D 33/048 |
| | | | | 210/770 |
| 2004/0195162 A1 * | 10/2004 | Imai | ............... | B01D 24/405 |
| | | | | 210/456 |
| 2004/0238429 A1 * | 12/2004 | Mulvey | ............... | B01D 24/14 |
| | | | | 210/275 |
| 2004/0238430 A1 * | 12/2004 | Moya | ............... | B01D 24/46 |
| | | | | 210/287 |
| 2005/0035071 A1 * | 2/2005 | Tolley | ............... | B01D 24/407 |
| | | | | 210/793 |
| 2006/0051273 A1 | 3/2006 | Son | | |
| 2006/0124527 A1 * | 6/2006 | Goodwin | ............ | B01D 29/52 |
| | | | | 210/289 |
| 2006/0272319 A1 | 12/2006 | Dettling et al. | | |

(56) References Cited

U.S. PATENT DOCUMENTS

| | | | | |
|---|---|---|---|---|
| 2007/0044437 A1* | 3/2007 | Larnholm | B01D 50/20 | |
| | | | | 55/319 |
| 2007/0251876 A1* | 11/2007 | Krogue | B01D 39/2062 | |
| | | | | 210/497.1 |
| 2008/0029453 A1 | 2/2008 | Mertens et al. | | |
| 2008/0035560 A1* | 2/2008 | Hansen | B01D 33/048 | |
| | | | | 210/523 |
| 2008/0099413 A1* | 5/2008 | Tolley | B01D 24/407 | |
| | | | | 210/793 |
| 2008/0168753 A1* | 7/2008 | Christiansen | B01D 45/16 | |
| | | | | 55/440 |
| 2008/0290532 A1* | 11/2008 | Kooijman | B01D 1/305 | |
| | | | | 261/108 |
| 2009/0294356 A1* | 12/2009 | Beggs | C02F 3/04 | |
| | | | | 210/275 |
| 2009/0297766 A1 | 12/2009 | Furuta | | |
| 2010/0206795 A1* | 8/2010 | Chernoff | C02F 1/004 | |
| | | | | 210/232 |
| 2010/0320159 A1* | 12/2010 | Lee | B01D 24/4631 | |
| | | | | 210/792 |
| 2013/0319928 A1* | 12/2013 | Zuber | B01D 29/66 | |
| | | | | 210/440 |
| 2017/0001131 A1* | 1/2017 | Bosisio | B01D 24/105 | |
| 2019/0291028 A1* | 9/2019 | Nehlen, III | B01D 29/90 | |
| 2019/0329165 A1* | 10/2019 | Backman | B01D 33/466 | |
| 2020/0179829 A1* | 6/2020 | Friend | B01D 24/4636 | |
| 2020/0384387 A1* | 12/2020 | Nehlen, III | B01D 29/52 | |
| 2021/0002145 A1* | 1/2021 | Chen | C02F 1/001 | |
| 2021/0039023 A1* | 2/2021 | Nehlen, III | B01D 29/52 | |
| 2021/0052996 A1* | 2/2021 | Nehlen, III | B01D 29/15 | |
| 2021/0069615 A1* | 3/2021 | Nap | C02F 1/281 | |
| 2021/0086111 A1* | 3/2021 | Nehlen, III | B01D 29/62 | |
| 2021/0214240 A1* | 7/2021 | Itai | C02F 1/001 | |
| 2021/0229006 A1* | 7/2021 | Nehlen, III | B01D 29/52 | |
| 2021/0245078 A1* | 8/2021 | Maiworm | C11B 3/008 | |
| 2021/0268409 A1* | 9/2021 | Ruzicka | B01D 35/30 | |
| 2021/0283535 A1* | 9/2021 | Shuster | B01D 29/52 | |
| 2021/0300789 A1* | 9/2021 | Phillips | B03D 1/028 | |
| 2021/0331098 A1* | 10/2021 | Nehlen, III | B01D 24/047 | |
| 2021/0346824 A1* | 11/2021 | Curley | B01D 24/16 | |
| 2021/0354056 A1* | 11/2021 | Dehn | B01D 29/52 | |
| 2021/0354057 A1* | 11/2021 | Saul | B01D 24/24 | |
| 2022/0062802 A1* | 3/2022 | Nehlen, III | B01D 29/90 | |
| 2022/0080337 A1* | 3/2022 | Kim | B01D 29/6438 | |
| 2022/0096968 A1* | 3/2022 | Wieseneder | B01D 24/12 | |
| 2022/0143534 A1* | 5/2022 | Vallejo | B01D 29/902 | |
| 2023/0052718 A1* | 2/2023 | Hawksley | B01D 29/72 | |
| 2023/0105431 A1* | 4/2023 | Dehn | B01D 24/14 | |
| | | | | 210/345 |
| 2023/0226470 A1* | 7/2023 | Strasser | B01D 29/66 | |
| | | | | 210/798 |
| 2023/0271113 A1* | 8/2023 | Kamath | G06F 30/17 | |
| | | | | 210/268 |
| 2023/0365429 A1* | 11/2023 | Gozashti | C02F 9/20 | |
| 2024/0131456 A1* | 4/2024 | Nehlen, III | B01D 29/66 | |
| 2024/0189742 A1* | 6/2024 | Phillips | B01D 24/24 | |
| 2024/0226782 A9* | 7/2024 | Nehlen, III | B01D 35/30 | |
| 2024/0269586 A1* | 8/2024 | Shuster | B01D 29/52 | |
| 2024/0318514 A1* | 9/2024 | John | B01D 29/66 | |
| 2025/0256986 A1* | 8/2025 | Gozashti | C02F 1/004 | |

FOREIGN PATENT DOCUMENTS

| | | | | |
|---|---|---|---|---|
| WO | 03/055570 | | 7/2003 | |
| WO | WO-2024086318 A1 * | | 4/2024 | B01D 29/15 |

* cited by examiner

REGENERATIVE MEDIA FILTER

RELATED CASES

Priority for this application is hereby claimed under 35 U.S.C. § 119(e) to commonly owned and U.S. Provisional Patent Application No. 63/418,384 which was filed on Oct. 21, 2022 and which is incorporated by reference herein in its entirety.

FIELD OF THE INVENTION

The present invention relates in general to regenerative media filters, and pertains more particularly to a regenerative media filter in which there is provided a dual port arrangement either at an influent side or an effluent side thereof.

BACKGROUND OF THE INVENTION

Current state-of-the-art for regenerative media filters has a single influent/single effluent construction. Regenerative media filters are unique in that they undergo a "regeneration cycle" due to one or more causes: filtering time, differential pressure, and/or other sensing indications. In a typical cartridge, bag, or grid filter, the element will be removed and replaced or cleaned. In a granular type filter it may be backwashed. Regenerative media filters shake the media loose while the filter tank is filled with water or some other liquid medium, with the pump stopped, the effluent valve closed and the revival (precoat) valve open. In accordance with the concept of the present invention, in one embodiment thereof, there is provided a block and bypass valve pair on each effluent line.

SUMMARY OF THE INVENTION

Accordingly, it is an object of the present invention to be able to build a regenerative filter, or any pressure vessel, with this unique configuration that will allow for a number of innovations. The following represent broadly the possible options for the present invention:

A. Single inlet/two or more outlets
B. Two or more inlets/single outlet
C. Two or more inlets and two or more outlets In accordance with one embodiment of the present invention there is provided a regenerative filter comprising a filter housing having inlet and outlet zones; a fluid path provided between the inlet and outlet zones; a plurality of filter elements each having an outer surface filter media applied thereto and functioning to filter particulate or contaminants from the fluid path; and a tube sheet that is supported across the filter housing, that is disposed just before the outlet zone and that provides a support for the plurality of filter elements. The plurality of filter elements are disposed in an array that defines an interstitial space that is disposed between adjacent filter elements. The regenerative filter also includes an inlet nozzle arrangement that is disposed within the filter housing at the inlet zone and that is constructed and arranged so as to direct the fluid path away from the plurality of filter elements so as to assist in maintaining a controlled turbulence at the inlet zone. In accordance with the present invention the inlet nozzle arrangement comprises a pair of inlet tube that are arranged in juxtaposition at the inlet zone and each having one end where the fluid flow enters a respective inlet tube from outside the filter housing.

In accordance with other aspects of the present invention the inlet tube is enclosed but includes at least one exit slot that directs the fluid flow downward away from the plurality of filter elements, and wherein the regenerative filter is controlled by a valving system so that one of the inlet nozzles of the pair of inlet nozzles can be interrupted for service while the other inlet nozzle of the pair of inlet nozzles continues to function; the pair of inlet tubes are arranged one above the other; the pair of inlet tubes are arranged in an opposed position; the inlet tube has a cylindrical body, the at least one slot is positioned in a sidewall of the cylindrical body, and wherein the at least one slot is positioned facing a bottom surface of the housing.

In accordance with another version of the present invention there is provided a regenerative filter comprising: a filter housing having inlet and outlet zones; a fluid path provided between the inlet and outlet zones; and a plurality of filter elements each having an outer surface filter media applied thereto and functioning to filter particulate or contaminants from the fluid path. The plurality of filter elements are disposed in an array that defines an interstitial space that is disposed between adjacent filter elements. The regenerative filter further includes an inlet port arrangement that is disposed at the filter housing leading to the inlet zone and that is constructed and arranged so as to direct the fluid path into the filter housing in a manner so as to maintain a controlled turbulence at the inlet zone; In accordance with the present invention the inlet port arrangement comprises a pair of inlet ports that are arranged in juxtaposition at the inlet zone and each having one end where the fluid flow enters.

In accordance with still other aspects of the present invention there is included a first influent nozzle at one of the pair of inlet ports and a second influent nozzle at the other of the pair of inlet ports; the first influent nozzle is enclosed but includes at least one exit slot that directs the fluid flow away from the plurality of filter elements; and including a tube sheet that is supported across the filter housing, that is disposed just before the outlet zone and that provides a support for the plurality of filter elements.

In accordance with still another version of the present invention there is provided a filter control system comprising: a filter housing having inlet and outlet zones; a fluid path provided between the inlet and outlet zones; and a plurality of filter elements each having an outer surface filter media applied thereto and functioning to filter particulate or contaminants from the fluid path; said plurality of filter elements being disposed in a parallel array; and an inlet port arrangement that is disposed at the filter housing leading to the inlet zone and that is constructed and arranged so as to direct the fluid path into the filter housing; wherein the inlet port arrangement comprises a pair of inlet ports that each have one end where the fluid flow enters; and wherein each inlet port includes a pump and at least one associated isolation valve.

In accordance with still other aspects of the present invention there is included a controller for controlling isolation valves associated with respective inlet pumps; the controller operates in one mode to have both isolation valves open in order to provide flow through both pumps; the controller operates in another mode to have one isolation valve open in order to provide flow through that respective pump while the other isolation valve is closed in order to stop flow in order to service the associated pump; there is also provided an outlet port arrangement that is disposed at the filter housing outlet zone; wherein the outlet port arrangement comprises a pair of effluent outlet ports that are arranged in opposed position at the outlet zone and each including a respective effluent line in which a further isolation valve is disposed; including respective precoat lines associated with each respective pump, and feeding from the respective effluent line to the associated pump; including a third isolation valve associated with each pump, and connected between respective precoat lines and pumps; wherein each of the pair of inlet ports comprises an influent tube, and the pair of influent tubes are disposed longitudinally in alignment, and each has an end cap; wherein each of the pair of inlet ports comprises an influent tube, and the pair of influent tubes are disposed one over the other; and wherein each of the pair of inlet ports comprises an influent tube, and the influent tubes are disposed in a radial array.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1:
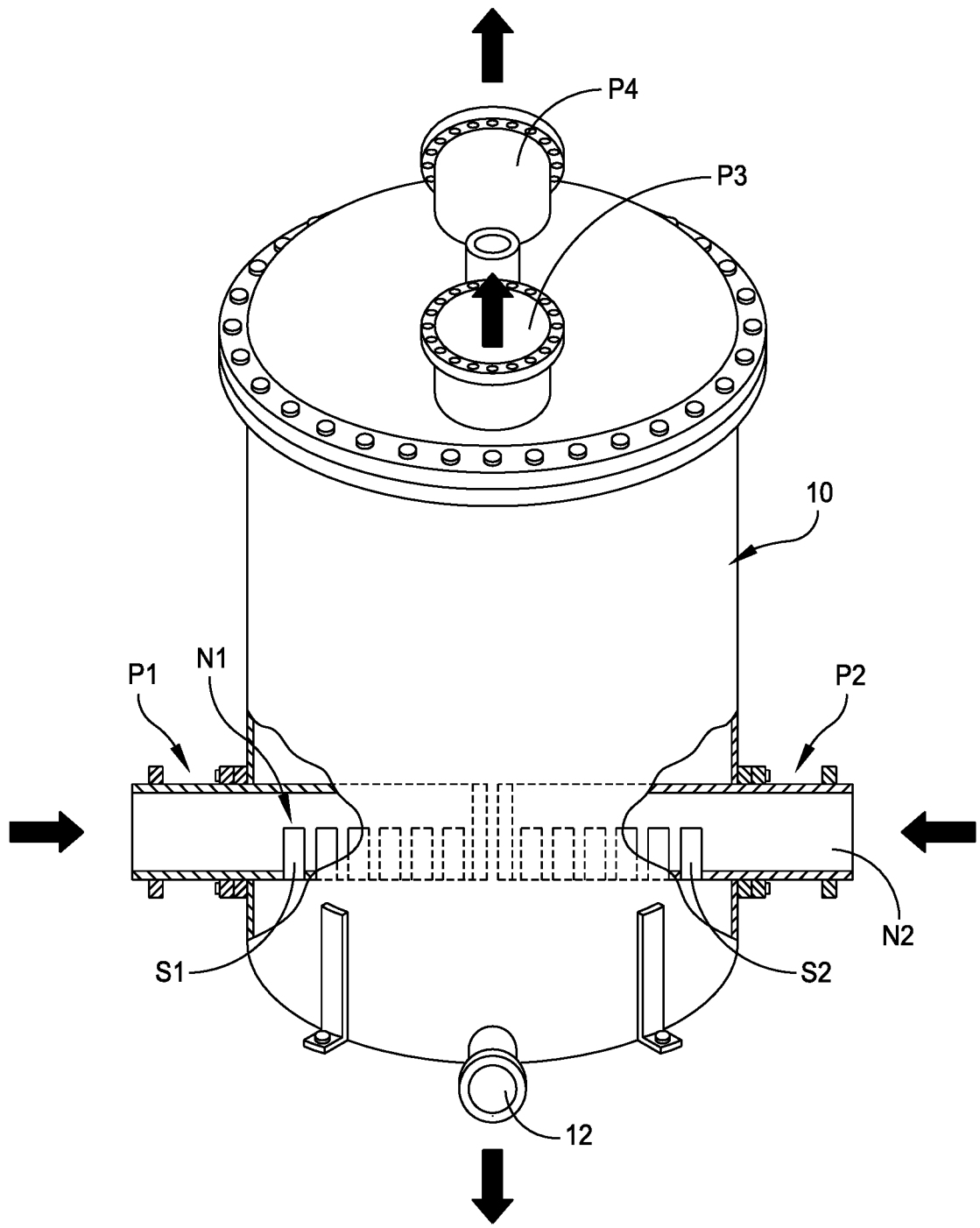
FIG. 1 is a schematic diagram of a first embodiment of the present invention that employs two inlet ports and two outlet ports.

The following represent certain innovations that are associated with concepts of the present invention. Below is a list of important features.

1. Economizing the pump room piping diameters by splitting the flow into two or more circuits allows, for instance, two or more smaller diameter pipes to replace one large pipe which would be required to keep the flow velocity below acceptable limits, typically 10 ft/sec.
2. Two or more smaller lines would transport the same volume of required liquid to be filtered at a substantial savings in cost. For example, if one needs 6000 gpm they typically use an 18 inch diameter pipe. With the present invention, for example, one can use two 12 inch diameter pipes. Two 12-inch diameter pipes would cost in total about half of the cost of an 18 inch pipe. As the flow rates increase, and the single pipe diameter increases to 20 inches and beyond, the economics means further in a savings. Preferred in accordance with the present invention is the innovation of providing multiples on both the influent and effluent sides of the filter.
3. In the prior art, if maintenance needs to be performed on the pump or other auxiliary equipment, the system must be stopped. In the new embodiment, each leg (port) could be isolated while the other one continues to push water through the regenerative media filter and protect the liquid being filtered and the related downstream components. This is true for equipment on the influent side of the filter (strainers, valves, pumps, sensing and metering equipment) and equipment on the effluent side of the filter (disinfection equipment such as ultraviolet light, ozone, chemical dosing; heat exchangers, flow meters, temperature sensors, conditioning equipment, feeders, etc). All maintenance activities will be enhanced by this new embodiment, including leak abatement since leaks in commercial grade piping is largely obviated by good design and installation practices. A leak in an 18 inch pipe has the potential to be catastrophic (comparatively) to a system designed with two 12 inch diameter pipes.
4. In the new embodiment, energy savings are enhanced as two or more smaller variable frequency drives and the motors on the pumps will be less subject to losses inherent in the current state-of-the-art for those devices as compared to the single pump/motor and variable frequency drive required to maintain the desired flow rate.
5. Welding two or more smaller diameter nozzles to the pressure vessel generally allows for thinner materials overall, and may offset the requirement for reinforcement pads to take the stress loads imposed by removing large, singular nozzle attachment points. Thus, while the perimeter of two 12 inch OD pipes is 75.4 lineal inches of weld for a single pass with two required (inside and out) for a total of approximately 150 lineal inches of weld, one single 18 inch OD pipe is 56.5 inches but will require 4 passes or over 200 inches of lineal weld.

With the above improvements in mind reference is now made to the drawings in this application. As has been indicated previously, there are a number of options for providing multiple influent and effluent ports at a regenerative filter housing. These potential embodiments include 1) Single inlet/two or more outlets; 2) Two or more inlets/single outlet; 3) Two or more inlets and two or more outlets.

One of the advantages of the present invention is that the separate influent ports can be isolated from one another so that one of the ports can be interrupted for service while the other port continues to function. This will be described in further detail in connection with FIGS. 10 and 11.

Figure 4:
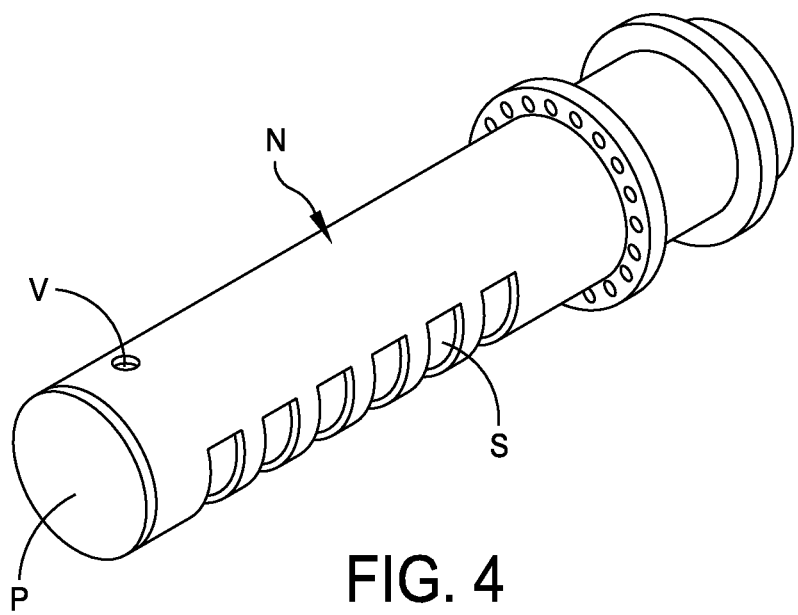
FIG. 4 is a perspective view of a preferred nozzle construction.
Figure 5:
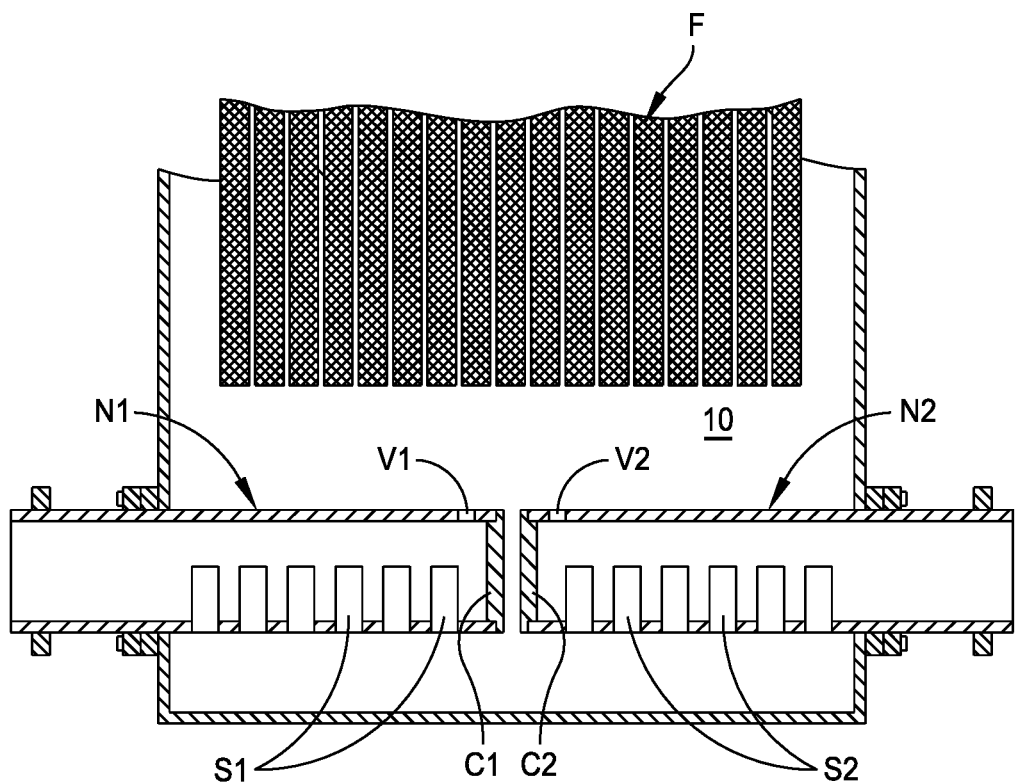
FIG. 5 is a cross-sectional view taken along line 5-5 of FIG. 3 and furthermore illustrating a filter array.

FIG. 1 describes the filter housing at 10 and a pair of nozzles N1 and N2 each with a respective series of slots S1 and S2. Again, reference may be made to FIG. 4 of the present application that shows in a perspective view a nozzle N with a series of slots S. The nozzle preferably includes an end cap P and a vent V. The vent V may be in the form of a small diameter hole useful in venting air at the top of the nozzle. In FIG. 5 note the respective caps C1 and C2 and the associated vents V1 and V2. FIG. 5 also shows the filter array at F. Details of the filter array are not disclosed in this application. However, please make reference to and incorporate by reference U.S. Pat. No. 10,814,256 which clearly identifies the filter array and the position of the filter array relative to the nozzle structure. We also incorporate by reference FIGS. 14-17A of the '256 patent which describes the complete construction of the nozzle. In this regard, each arcuate nozzle slot S is arranged in a pair as described in the '256 patent separated by a wall so that the input flow is directed sideways in order to minimize turbulence.

Figure 2:
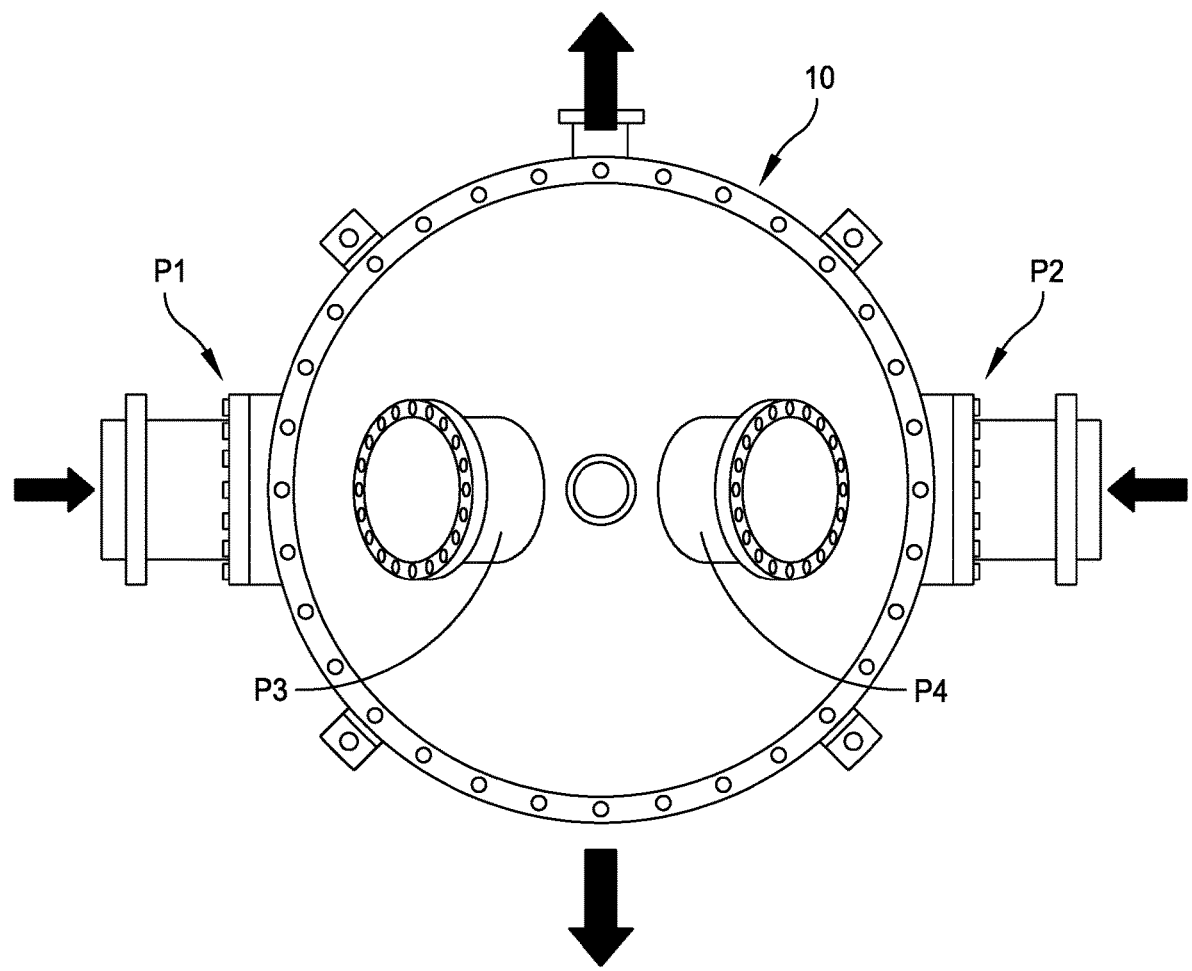
FIG. 2 is a schematic diagram of a top view of a porting arrangement for the regenerative filter in which the influent and effluent ports are in alignment.
Figure 3:
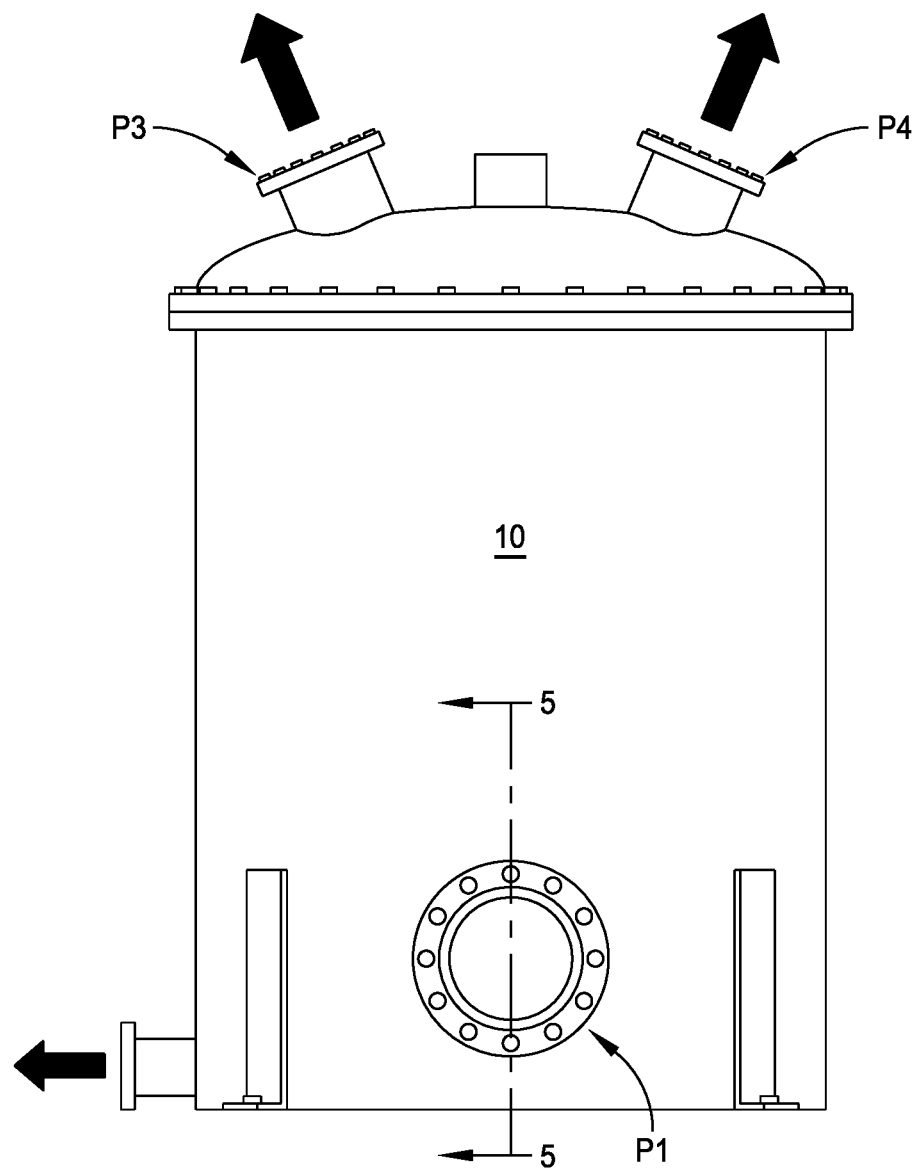
FIG. 3 is a schematic diagram related to FIG. 1 and showing the influent and effluent ports.

FIG. 2 is a top view illustrating the filter housing 10 with the influent ports P1 and P2 essentially in alignment with the effluent ports P3 and P4. This embodiment would also employ a nozzle structure to that shown in FIG. 1. FIG. 3 is a side view of the filter housing of FIG. 1. FIG. 3 illustrates one of the influent ports, namely port P1 and corresponding effluent ports P3 and P4.

In each of the embodiments described herein the nozzle structure is intended to have an end cap particularly where the nozzles are in alignment such as in FIG. 5. As indicated previously, each of these nozzles is provided, at a top thereof, with a vent hole V that is useful in venting air.

Figure 6:
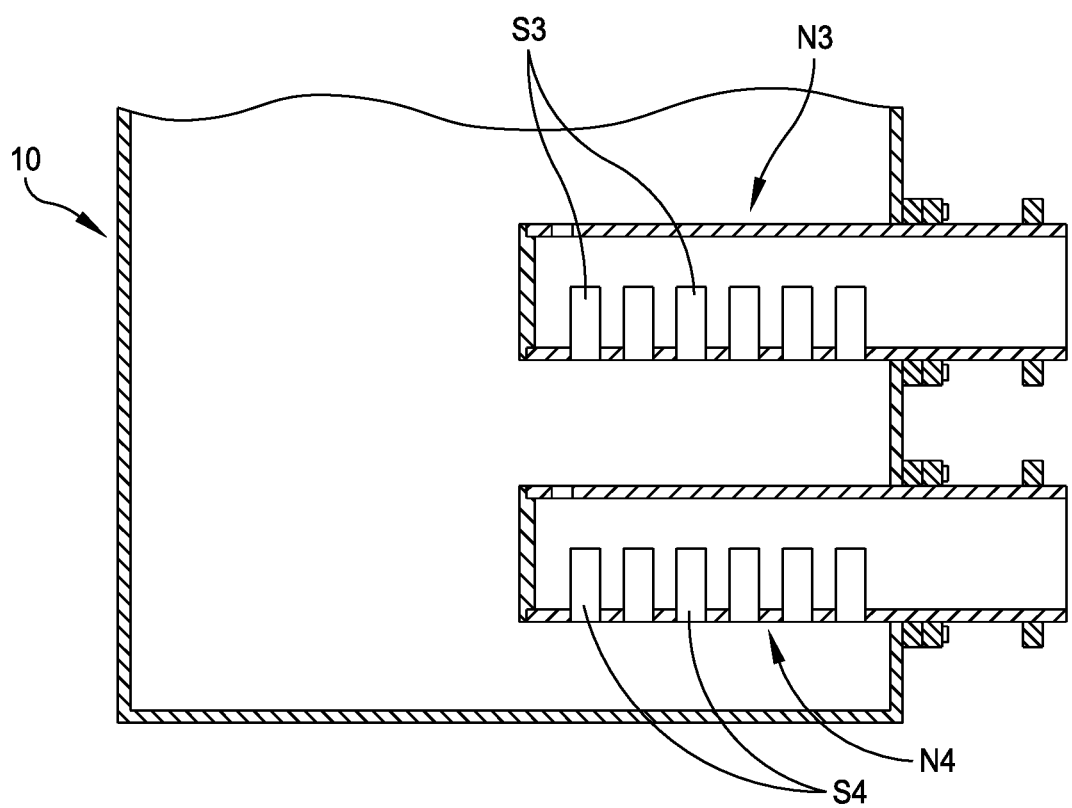
FIG. 6 is a schematic diagram of an alternate embodiment of the present invention in which the inlet nozzles are juxtapositioned one over the other.

FIG. 6 is a cross-sectional view of another embodiment of the present invention in which the nozzles N3 and N4 are disposed one over the other. In this embodiment each of the nozzles N3 and N4 has respective slots S3 and S4. Each of these slots is arcuate in shape but is interrupted by a wall that directs the flow sideways.

Figure 7:
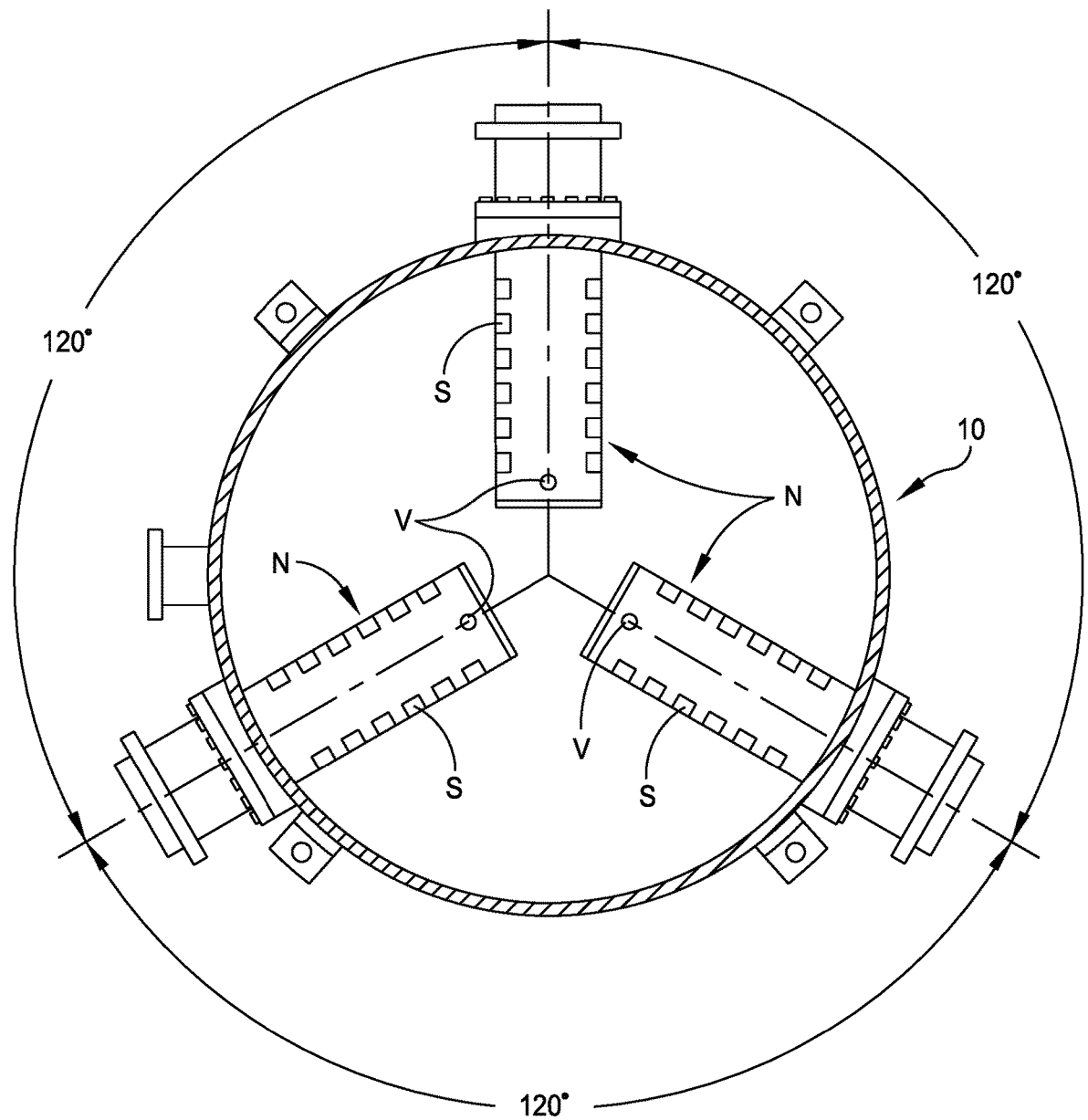
FIG. 7 is a schematic diagram showing the inlet ports and associated nozzles separated by 120 degrees.

FIG. 7 is a schematic top view showing a further nozzle arrangement in which each of the nozzles N are disposed at a relatively 120 degree angle to the other. FIG. 7 describes three of these nozzles in the form of influent nozzles that extend through the wall of the filter housing. It is noted that each of these nozzles is provided with a vent hole V. An end cap C may be provided at the inner end of each nozzle N. In FIG. 7 the three nozzles may be considered as disposed at the same horizontal plane. An alternate arrangement is shown and described in FIG. 9 herein.

Figure 8:
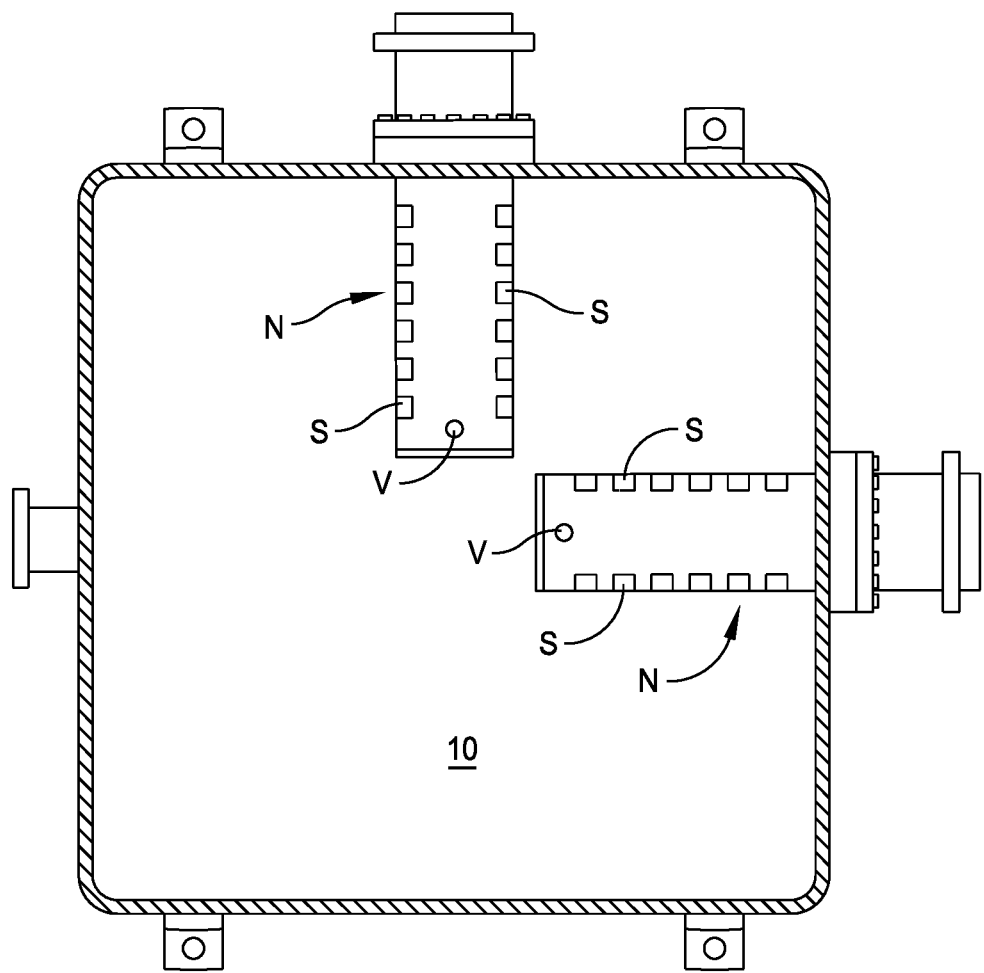
FIG. 8 is still another embodiment of the present invention in which the filter housing is square or rectangular and the inlet ports and nozzles are disposed at 90 degrees to each other.

FIG. 8 describes an embodiment of the present invention in which the nozzles N are disposed at 90 degrees to each other. Each of the nozzles structures illustrated in FIG. 8 may be substantially identical to that described in the perspective view of FIG. 4 including lower disposed arcuate slots S. In FIG. 8 each of the nozzles N is also provided with an end vent hole V.

Figure 9:
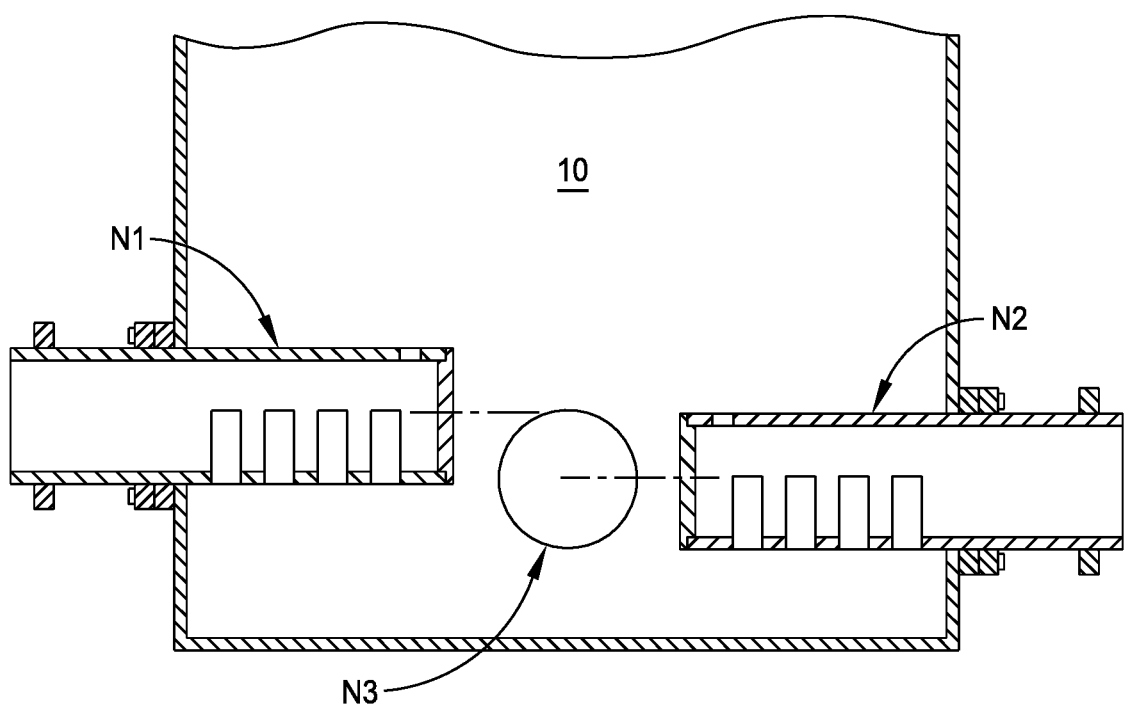
FIG. 9 is a schematic diagram illustrating the use of three inlet ports and associated nozzles that are disposed on separate center lines.

Reference is now made to FIG. 9 which illustrates three inlet nozzles N1, N2 and N3. These may be disposed in a pattern similar to that illustrated in FIG. 7 disposed approximately 120 degrees to each other. Alternatively, the three nozzles may be disposed at other angular relationships. In this particular embodiment it is noted that center lines L1, L2 and L3 of each nozzle do not coincide but are instead at different vertical positions.

Figure 10:
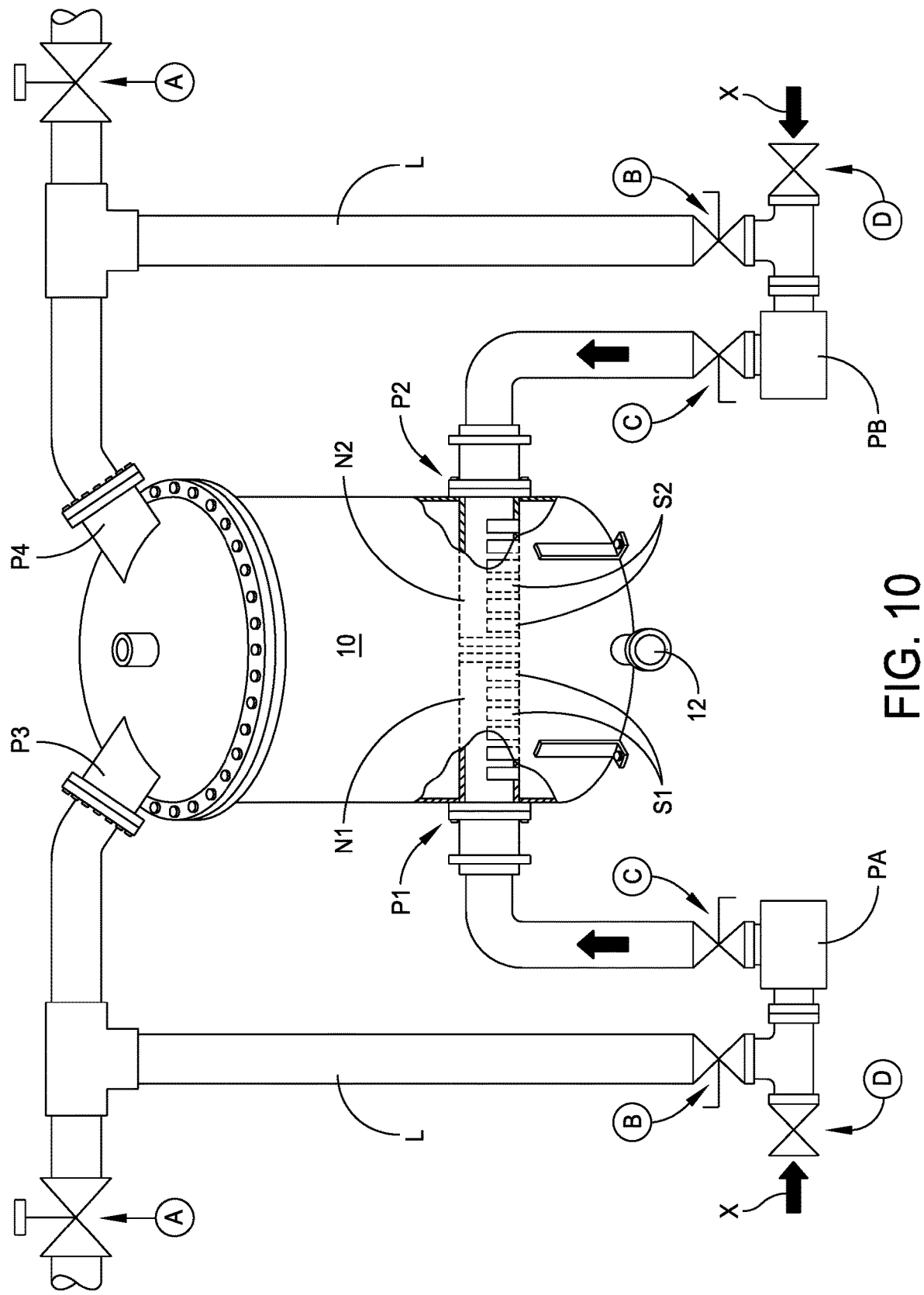
FIG. 10 is a schematic diagram of the filter system of the present invention employing separate pumps and valve controls for the respective influent ports P1 and P2.

Reference is now made to the schematic diagram of FIG. 10 which is important in illustrating the control factors associated with the filter housing 10. The filter housing in FIG. 10 is similar to that described in FIG. 2 with a pair of influent ports P1 and P2 and a pair of effluent ports P3 and P4. Once again, each of the nozzles N1 and N2 is provided with a series of respective downwardly facing slots S1 and S2. In FIG. 10 the filter housing 10 is considered as also having a drain port at 12.

The system described in FIG. 10 includes separate pumps PA and PB associated respectively with ports P1 and P2. Each of these pumps includes, for control purposes, isolation valves B and C. There is also, at the effluent side, an isolation valve A that is associated with each of the effluent ports P3 and P4. These isolation valves are associated with both of the respective pumps. By way of example, the controls of these valves can be such that the valves A, B and C associated with the pump PB can be closed so that the pump PB can be serviced. At the same time, the pump PA may continue to be running with the filter action still functioning.

In FIG. 10 there is also disclosed a check valve D at an input to each of the pumps PA and PB. Unfiltered flow from the filtering process, as represented by arrow X in FIG. 10, travels through each check valve D to a respective pump PA, PB. In FIG. 10 the isolation valve C connects from an output of the respective pump to an inlet port P1, P2, as illustrated. FIG. 10 also depicts the precoat feedback line L associated with each respective influent port P1, P2. Each line L actually connects from an effluent port back, by way of the isolation valve B, to a respective pump PA, PB. In the normal processing the precoat line L provides for the precoating of the filter elements. When one of the pumps is turned off, then no precoating occurs.

Figure 11A:
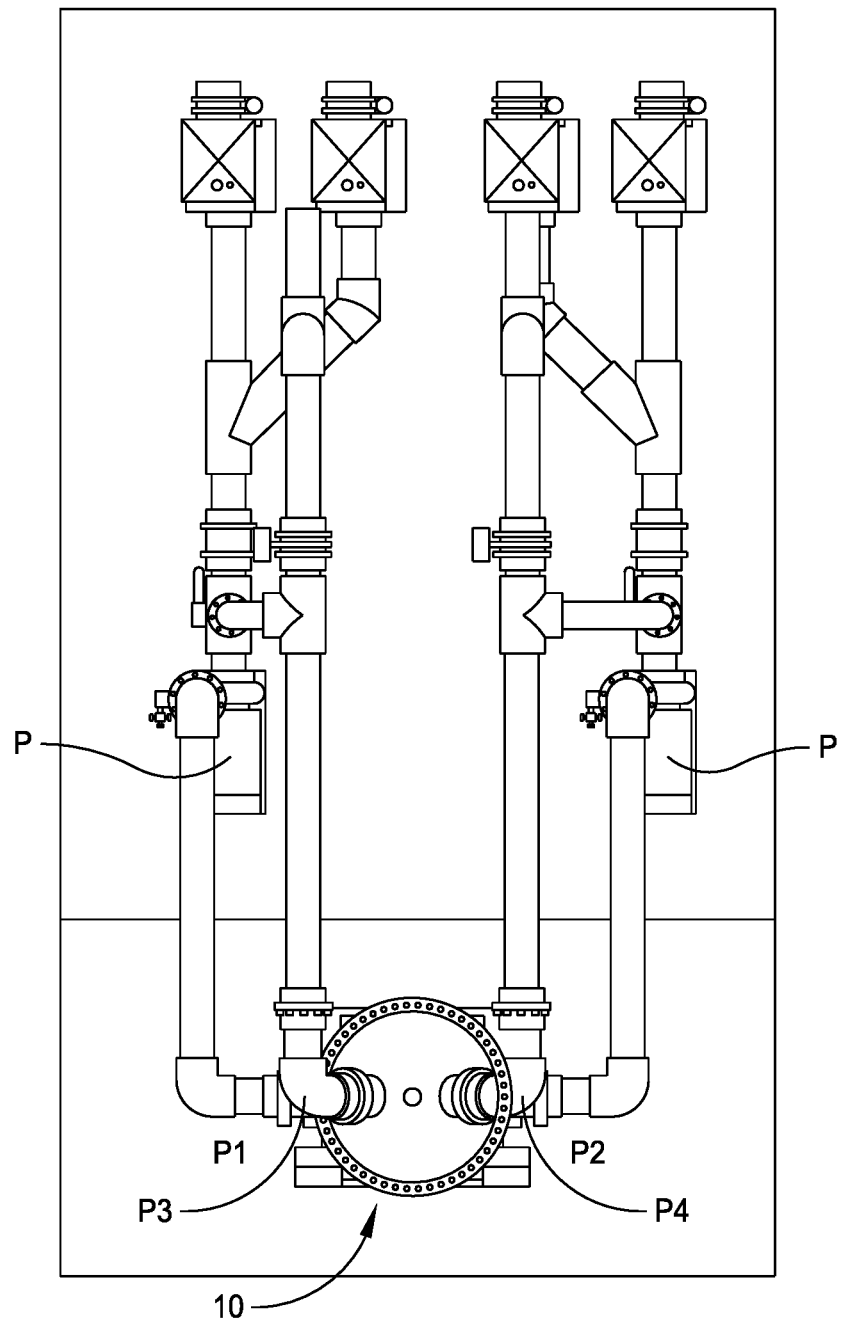
FIG. 11A is a top view of the control system of the filter.
Figure 11B:
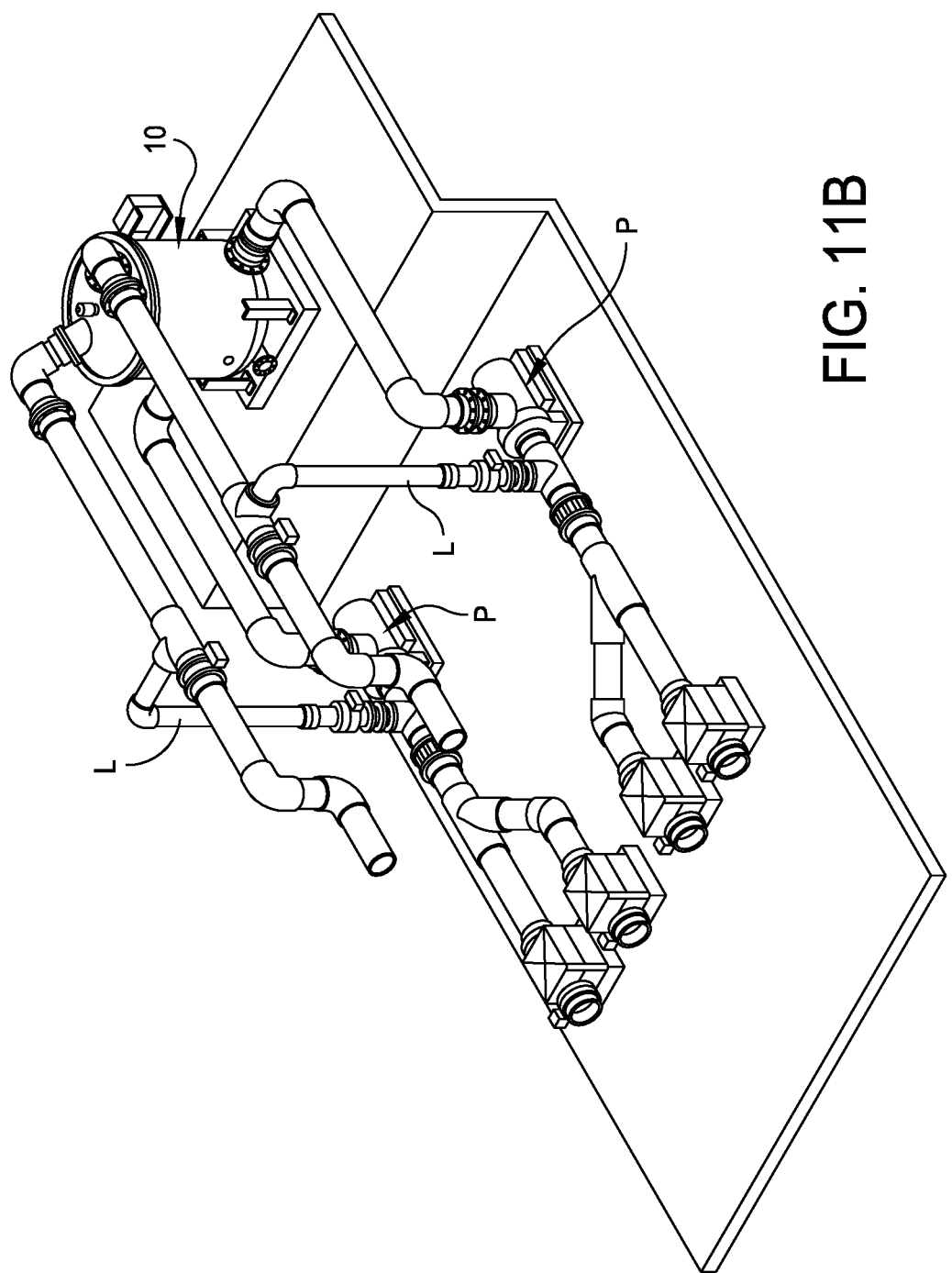
FIG. 11B is a perspective view of the control system of the filter.
Figure 11C:
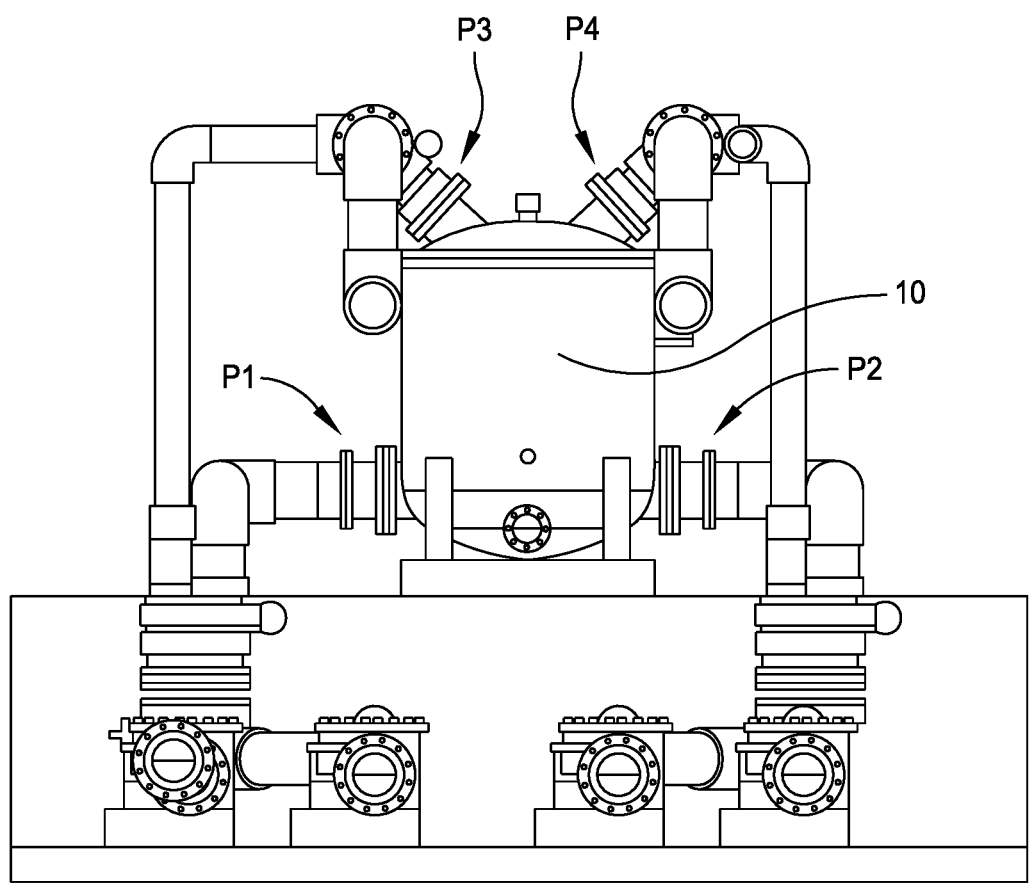
FIG. 11C is a front view of the control system for the filter.
Figure 11D:
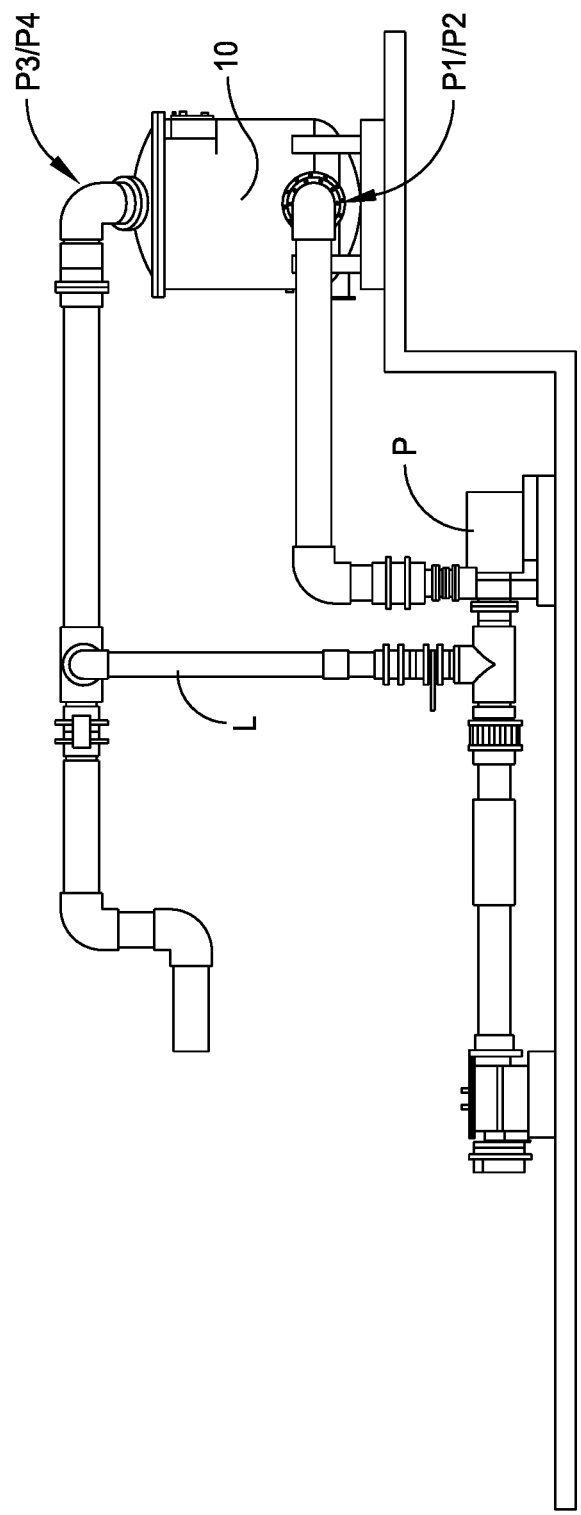
FIG. 11D is a side view of the control system for the filter.

Reference is also now made to further details associated with the control diagram of FIG. 10. FIGS. 11A-11D illustrate various views. For example, FIG. 11A is a top view showing the piping that is used for connecting the various components including the pumps and the isolation valves. The pumps are shown at P. FIG. 11A also shows the ports P1, P2, P3 and P4. FIG. 11B is a perspective view that illustrates the interconnecting piping. FIG. 11B illustrates the filter housing at 10; the two pumps at P; the feedback lines L; and the ports P1, P2, P3 and P4. FIG. 11C is a front view of the same system as depicted in FIGS. 11A and 11B. FIG. 11D is a side view of the same system as depicted in FIGS. 11A to 11C. This shows the filter 10; the precoat lines L; the pump at P; and the ports P1, P2, P3 and P4.

The pumps are preferably connected to a wall mounted electronic device called a VFD (variable frequency drive) and the purpose of that is to control the speed, and therefore the flow rate, provided by the pump/motor set.

The flow meter in each effluent line will be tied to the VFD (variable frequency drive) for a PID (proportional integral derivative) loop but instead of only acting on the pump motor, the effluent valve will be modulating so that the flow rate in each effluent line may be varied or maintained equal depending upon downstream demand. The variable frequency drive takes a standard electrical supply at 60 hz and outputs a variable frequency between 0-100 hz to adjust the motor and hence, the pump output. A PID is a proportional integral derivative loop control for a modulating system.

The innovation of the present Invention allows the effluent lines to be separated or brought together past the effluent valve, so as in the case of needing to service pump PA while pump PB delivers filtered liquid to either only effluent line A or both effluent lines where they may be joined with a single bypass valve downstream of the effluent valves in both lines.

Figure 12:
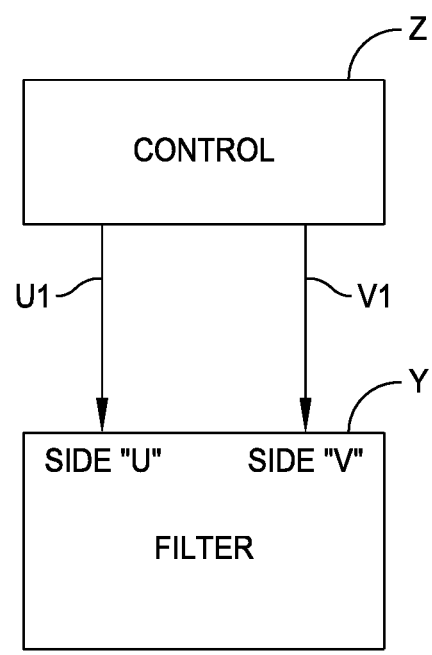
FIG. 12 is an instructional block diagram useful in describing the process associated with the present invention.

Reference is now made to a simple block diagram in FIG. 12 that explains the alternate process of the present invention wherein the controls of the valves are such that the valves A, B and C associated with the pump PB can be closed so that the pump PB can be serviced. At the same time, the pump PA may continue to be running with the filter action still functioning. Pump PA would thus have its associated isolation valves open allowing flow. In FIG. 12 the filter is shown at block Y, and a controller at Z. Note that the filter Y is considered as having separate sides identified as side U and side V where respective signals U1, V1 that are originated from the controller Z connect in order to control the isolation valves A, B and C (refer to FIG. 10). When the filter is operating normally both of the signals U1 and V1 control all the isolation valves to be open allowing flow via both pumps. To service one of the pumps then one of the lines U1 or V1 controls the other pump to operate while ceasing operation of the one pump. At any one point in time at least one of the lines U1 and V1 is active so that filtering continues. The control via lines or signals U1 and V1 may be by a manual control; by a set pattern; or by electronic control based on one or more factors.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A regenerative filter assembly comprising:
   a filter housing having at least one elongate sidewall defining an interior volume;
   a tube sheet dividing the interior volume into an upper filtrate volume in fluid communication with at least one filtrate outlet port of the filter housing permitting egress of filtrate, and a lower unfiltered volume for receiving fluid to be filtered;
   an array of individual filter elements being suspended from the tube sheet and extending into the unfiltered volume, each individual filter element being spaced from each adjacent filter element in the array;
   a plurality of influent ports each extending through the at least one elongate sidewall of the filter housing;
   a plurality of inlet nozzles extending through respective influent ports, and into the lower unfiltered volume of the filter housing, each inlet nozzle being provided with at least one downwardly facing slot;
   wherein, an uppermost portion of each inlet nozzle is spaced from a lowermost portion of the array of individual filter elements; and
   wherein, a fluid to be filtered is introduced into the unfiltered volume through the plurality of inlet nozzles, directed in a downwardly facing direction away from the array of individual filter elements, subsequently, flowing up through the array of individual filter elements, through the tube sheet, in to the upper filtrate volume and out of the filter housing through the at least one filtrate outlet port.

2. The regenerative filter assembly of claim 1, wherein the plurality of inlet nozzles each include a vent port at a top of each inlet nozzle for venting air.

3. The regenerative filter assembly of claim 1, wherein the plurality of inlet nozzles each include a cap at the distal end of each inlet nozzle.

4. The regenerative filter assembly of claim 3, wherein the plurality of inlet nozzles each include a vent port at a top of each inlet nozzle for venting air.

5. The regenerative filter assembly of claim 1, wherein the filter housing has a cylindrical cross-section.

6. The regenerative filter assembly of claim 1, wherein the filter housing has a square cross-section.

7. The regenerative filter assembly of claim 1, wherein the plurality of inlet nozzles includes a pair of inlet nozzles, and wherein the regenerative filter assembly includes and is controlled by a valving system so that one of the inlet nozzles of the pair of inlet nozzles can be interrupted for service while the other inlet nozzle of the pair of inlet nozzles continues to function.

8. The regenerative filter assembly of claim 7, wherein each inlet nozzle includes an inlet pump and at least one isolation valve.

9. The regenerative filter assembly of claim 8, including a controller for controlling the isolation valves.

10. The regenerative filter assembly of claim 9, wherein the controller operates in one mode to have both of the at least one isolation valves open in order to provide flow through both pumps.

11. The regenerative filter assembly of claim 9, wherein the controller operates in another mode to have one isolation valve open in order to provide flow through the respective pump while the other isolation valve is closed in order to stop flow.

12. The regenerative filter assembly of claim 1, including a pair of filtrate outlet ports that are arranged in opposed position at the upper filtrate volume.

13. The regenerative filter assembly of claim 12, including a dome disposed over the filter housing with the pair of filtrate outlet ports being arranged in the dome.

14. The regenerative filter assembly of claim 12, wherein the plurality of inlet nozzles includes a pair of inlet nozzles that are respectively disposed in opposed position at opposed sides of the filter housing.

15. The regenerative filter assembly of claim 14, wherein the pair of filtrate outlet ports are disposed in line with the pair of inlet nozzles.

16. The regenerative filter assembly of claim 14, wherein the pair of filtrate outlet ports are disposed orthogonal to the pair of inlet nozzles.

17. The regenerative filter assembly of claim 1, wherein the plurality of inlet nozzles includes a pair of inlet nozzles that are respectively disposed in an opposed position at opposed sides of the filter housing.

18. The regenerative filter assembly of claim 1, wherein the plurality of inlet nozzles includes a pair of inlet nozzles that are respectively disposed one over the other.

19. The regenerative filter assembly of claim 1, wherein the plurality of inlet nozzles are disposed radially.

* * * * *